Patented Jan. 10, 1950

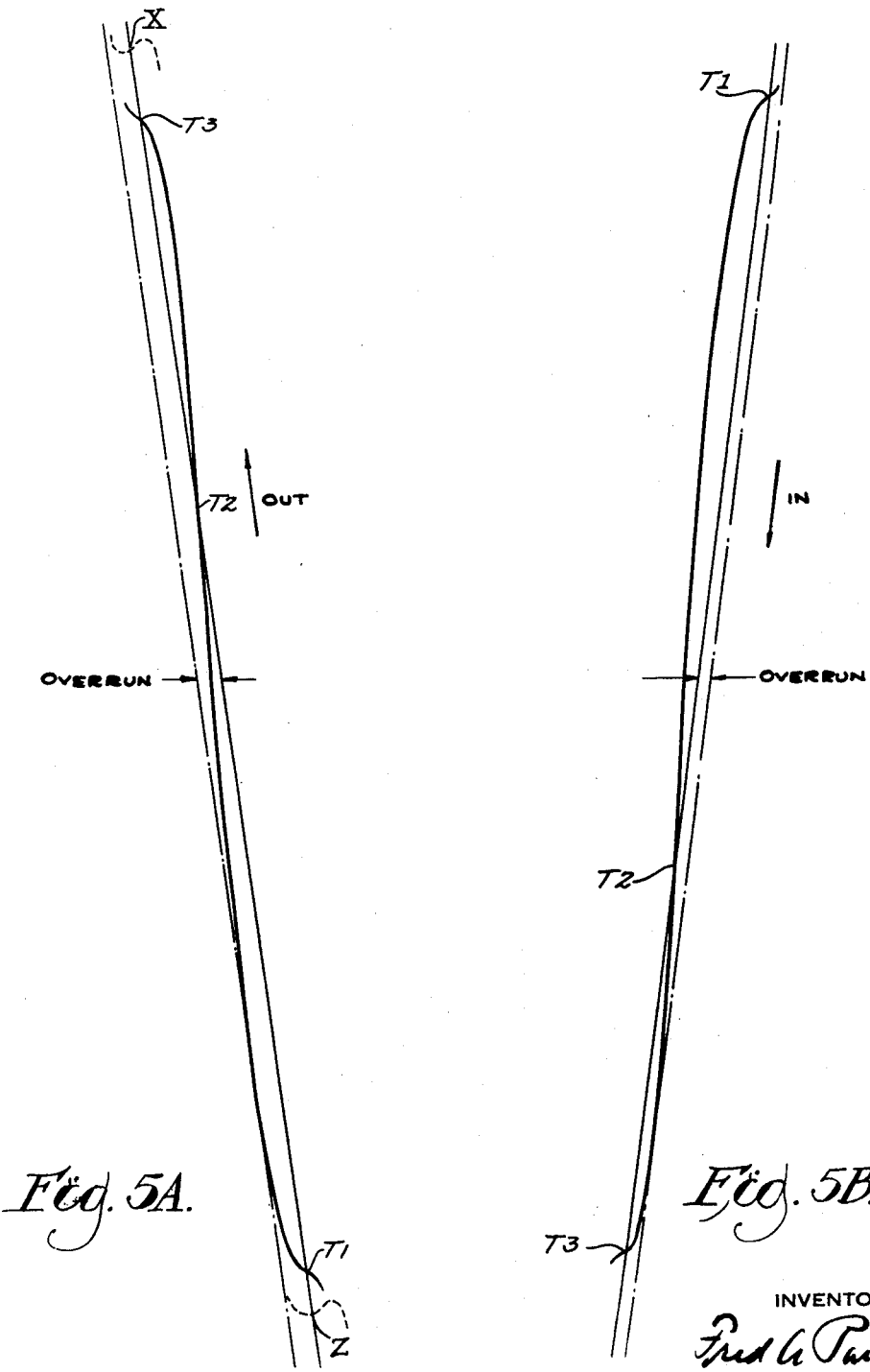

2,493,827

UNITED STATES PATENT OFFICE 2,493,827

TRANSMISSION AND CONTROL MECHANISM FOR MACHINE TOOLS

Fred A. Parsons, Milwaukee, Wis., assignor to Kearney & Trecker Corporation, West Allis, Wis., a corporation of Wisconsin Application November 29, 1943, Serial No. 512,112

19 Claims. (Cl. 90—13.5)

This invention relates to transmission and control mechanism for machine tools and particularly to the automatic pattern control of the movement of a machine tool.

Some of the features of the invention are similar to certain features of the copending applications now resulted in Patents 2,335,304 and 2,335,305, issued November 30, 1943. As to such features the present invention is a continuation-in-part of said previous applications.

A purpose of the invention is to provide a transmission and primary control means therefor responsive to the configuration of a pattern for correction of the tool path to conform to the pattern configuration in a minimum of time.

A further purpose is to provide a transmission and primary control means therefor in a form regenerative or semi-regenerative of power expended in overcoming inertia during changes of tool path direction, whereby to effect the direction changes with a minimum expenditure of power.

When power is applied to a machine tool transmission for tool direction changes in response to changes in pattern configurations, or for transmission adjustments required for maintaining a path previously determined by the pattern, the normal initial result is a series of alternately opposite direction overrun movements of the tool, first to the one and then to the other side of the tool path corresponding to the instant pattern surface. Such overrun movements may be termed oscillations or jiggles, and the accuracy at any point in the copying operation is at least in part determined by the amplitude of the instant jiggles.

A further purpose is to provide a transmission and primary control means therefor in a form such that any initial direction-correction jiggles will be quickly eliminated, or stabilized to effect jiggles of minimum size.

A further purpose is to provide, in a transmission having a primary control means, a secondary or straight-path control means cooperating with the primary control means for eliminating jiggles during copying of any constant pattern angles, and thereby to eliminate power required for overcoming acceleration-deceleration inertia.

A further purpose is to provide, in a transmission having a primary control means, a straight-path secondary control means in such form and combination as to assist in the above mentioned stabilization by the primary control means.

A further purpose is to provide a transmission and pattern controlled primary and secondary straight-path control means therefor in such form and combination that the operation of the secondary control means does not operate to delay the operation of the primary control means.

A further purpose is to provide a transmission and pattern controlled primary and secondary straight-path control means therefor in which the cooperating control means operates to effect a straight-path result in a minimum of time, and operates with maximum effect to prevent any material departure from the straight-path result until such departure is made necessary by a change of the pattern configuration.

A further purpose is to provide a method of pattern controlled copying adapted to effect some or all of the purposes mentioned herein, either by a tracer control limited to one path of the machine movement, such as the in-out path for example, as may sometimes be desirable, or by the tracer control of two transverse paths such as the in-out and line paths of movement, the general features of the method being the same in either case.

A further purpose is to provide a control mechanism in which certain of the essentials are substantially the same for the practice of the method just mentioned in either of said alternative applications.

A further purpose is to provide a transmission and control mechanism for machine tools in which transmission lost motion effects are automatically eliminated, and particularly for copying machines.

A further purpose is to provide transmission and control mechanism for machine tools, in which the lag effects of inertia, etc., normally operating to resist and delay a rate change of the moving parts are controlled in such manner as to minimize the power, or the time interval, or both, required for rate change operations, and particularly for copying machines.

A further purpose is to provide a transmission and control mechanism for the relative movement of machine tool supports, in which brake devices operate in an improved transmission and control relationship for various purposes including a change of the relative rates of the supports and the elimination of lost motion, particularly for copying machines.

A further purpose is to provide improved hydraulically operated mechanism in a form and organization particularly adapted for effecting some or all of the purposes herein mentioned.

A further purpose is generally to simplify and improve the construction, organization, and operation of machine tools, and particularly for copying machines, and still other purposes will be apparent from the specification.

Various modifications of the invention herein illustrated and described are contemplated, and it is to be understood that the invention includes all modifications within the spirit and scope thereof, and of the claims.

In the specification the same reference characters have been used to indicate the same parts throughout, and in the drawings:

Figs. 5A, 5B are diagrams respectively for outward and inward angles which show the characteristic form of jiggles stabilized by the primary control mechanism of the machine of Fig. 1 during the copying of angles of about 83°.

In said co-pending applications it has been pointed out that the line and in-out movements of a copying machine may be applied to movable supports arranged in a variety of ways. The present transmission and control mechanism may be applied to any preferred arrangement of machine structure which provides the necessary movements and, therefore, no specific structural arrangement of the supports is shown herein. It will be understood, however, as explained in said co-pending applications, that the line movement as herein referred to operates for traversing the pattern and that the in and out movements are both in the same path but in directions toward and from the pattern respectively. The line and in-out paths are transverse to one another, usually at right angles. For profiling operations a cross feed is provided in a third path transverse to both the line and in-out paths. Various such cross feed mechanisms and their purpose and arrangement being well-known, the cross feed slide and operating mechanism is not shown herein, particularly since cross feed is not necessary to the practice of the invention in certain of its aspects.

Figure 1:
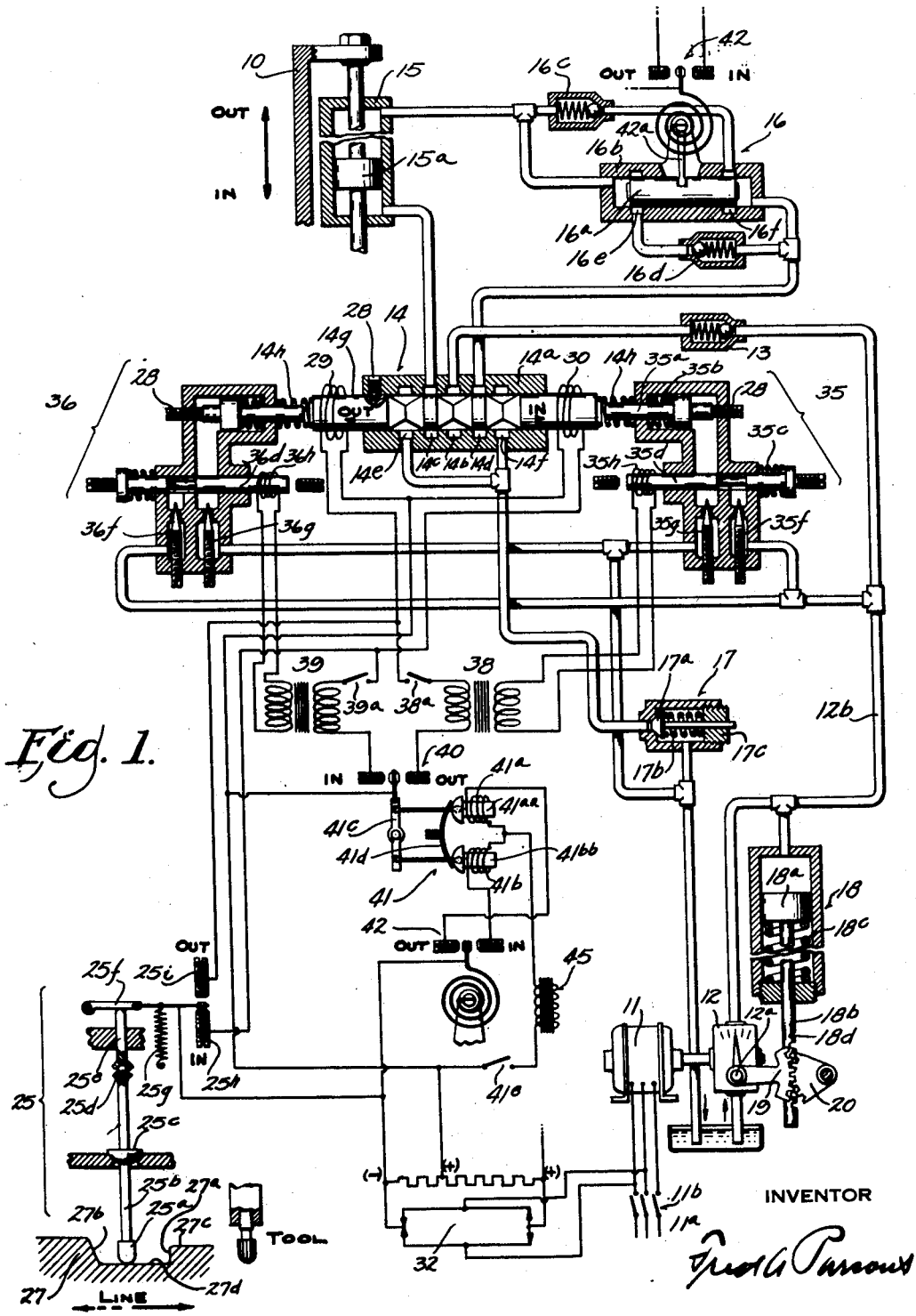
Figure 1 is a diagrammatic showing of the invention in certain of its aspects as applied to a machine where only the in-out path of movement is pattern controlled.

In the transmission and control mechanism of Fig. 1 an in-out support 10 is actuated from an electric motor 11 which receives current from a line 11a through a switch 11b. The machine also includes a line support and transmission (not shown) which may be of any suitable type for movement of the line support at various rates in a path at right angles to the in-out support. A variable volume pump 12 is driven from a constant speed electric motor 11. Pump 12 has an adjustment shaft 12a, and is connected through a channel 12b, a one-way valve 13, and a reverser and throttle valve 14, for supply of pumped liquid to operate a reversible hydraulic motor 15, the piston 15a of which is connected for movement of support 10 in either in or out direction according to position of valve 14. One of the channels between valve 14 and motor 15 includes a direction-responsive means generally denoted by the numeral 16, the construction and purpose of which will be explained later. In either direction position of the valve 14 the outow of liquid from motor 15 is through a back-pressure valve 17 having a valve member 17a and a spring 17b, the pressure of which is adjustable by the means of a threaded abutment member 17c, the back-pressure operating to eliminate lost motion and slack in the transmission.

The pump 12 also supplies liquid to an accumulator device 18, having a piston or plunger 18a and a piston rod 18b, there being a spring 18c operating to maintain pressure in the channels connecting the pump to motor 15. The piston rod 18b is provided with rack teeth 18d, connected to control the volumetric adjustment of pump 12 through a gear segment 19 which is fixed on the pump adjusting shaft 12a, there being a pivoted segment 20 which engages both with the rack teeth 18d and the teeth of the segment 19. The arrangement is such that when the motor 15 is using more liquid than is supplied by the instant adjustment of pump 12 the extra liquid is supplied from the accumulator 18, the spring 18c then forcing the plunger 18a upwardly in Fig. 1. Such plunger movement operates to adjust pump 12 in a direction to increase the volume pumped. Similarly, when the motor 15 is using less liquid than is provided by the instant pump adjustment the excess liquid operates to shift the plunger 18a in reverse direction, thereby to reduce the volume pumped. Thus the volume of pump 12 will be automatically adjusted to suit the instant requirements of the motor 15, which results in a minimum of power required from the electric motor 11.

The rate and direction of movement of the motor 15 and in-out support 10 are determined by a pattern controlled tracer device generally denoted by the numeral 25. Tracer 25, together with the copying tool shown in Fig. 1, is carried on the in-out support 10 or movable therewith and provides a stylus or feeler member 25a fixed on a shank or rod member 25b which is pivoted at 25c for movement of the stylus in any lateral direction, and permits upward, that is to say outward, movement thereof. Either of such movements operates through a ball 25d for upwardly shifting a rod 25e, thereby to shift a pivoted contact carrying bar 25f. Spring means 25g continuously urges the contact bar 25f in a direction to close an in contact 25h and at the same time urges the stylus 25a to its farthest down and laterally central control position, but if the stylus is displaced by a pattern such as 27, for example, the bar 25f is shifted to close an out contact 25i. The out and in contacts are each adjustable.

The reverser throttle valve 14 provides a housing 14a having a supply port 14b connected to the pump channel 12b, and a plurality of ports 14c, 14d respectively connected to the opposite ends of the cylinder of motor 15, together with drain ports 14e, 14f each of which are connected for outlet through the back pressure valve 17.

The valve 14 also provides a shiftable plunger 14g having reduced diameter tapered portions in an arrangement such that in the plunger central position, as shown in Fig. 1, each of the ports 14c, 14d is closed. But when the plunger is shifted in one direction from its central position the port 14c is opened to the supply port 14b while the port 14d is connected to the outlet port 14f, and when the plunger is shifted in the other direction the port 14d is connected to the supply port, while the port 14c is connected to outlet port 14e. The valve plunger may also occupy various intermediate positions for purposes later explained. The valve plunger is continuously urged toward the central position by opposed springs 14h, 14h, the springs being supplemented, as the plunger approaches its central position, by a spring pressed detent 28. The limits of opposite movement of the valve plunger 14g, except under certain conditions later explained, are established by adjustable abutments 28, 28.

The in and out contacts of tracer 25 operate respectively to effect shifting of valve plunger 14g in opposite directions. For such purpose there are solenoids 29, 30 associated with the plunger and energizable through the out contact 25i and the in contact 25h respectively, the energizing current being supplied from any suitable source, such as a rectifier 32, for example.

For the machine of Fig. 1, the line movement is not tracer controlled and, since such line movement may be provided by any suitable well-known support and transmission arrangement, as has been stated, such mechanism is not shown in Fig. 1. It will be understood however that its operation is to effect movement of the tracer relative to a pattern such as 27, Fig. 1, in a direction transverse to the in-out path, as indicated in Fig. 1.

The effective copying angle is measured, for purposes of the present disclosure, from the straight-line path, and may be either inward or outward for the same surface, depending upon the direction of line movement. Thus when line movement is in the direction of the solid arrow underneath the pattern 27, Fig. 1, the pattern surface 27a will be traced as an inward angle, in this instance as a 90° in angle, and the pattern surface 27b will be traced as an outward angle. If the line direction is reversed, as indicated by the dotted arrow, the surface 27b will be traced inwardly and the surface 27a will be traced outwardly, then being a 90° out angle. In either direction of line movement the pattern surfaces parallel to the light path will be traced as 0° angles, that is to say as straight line surfaces.

Where the line speed is constant, as in the machine of Fig. 1, that is to say where it is not tracer controlled, the in or out speed for the copying of angles must be accelerated to a velocity considerably greater than the product of the line speed multiplied by the tangent of the instant angle, as will appear. Straight out or in (90°) angles therefore would require either infinitely large in-out velocity or infinitely small line speeds and cannot be copied without the addition of means for pattern control of the line speed. Angles smaller than 90° can be copied while using a constant line speed, up to a limit determined by the characteristics of the machine, but very large angles will require very slow line speeds, resulting in low production.

The tracer controlled valve 14, Fig. 1, acts as a relay controlling forces for acceleration or deceleration of the in-out support in either direction. If the acceleration-deceleration force is constant the combined in-out and line movement causes the tool to move in a parabolic path. The general characteristics of the copying resulting from the machine of Fig. 1 may be understood by considering the tool path where the acceleration-deceleration force is constant.

Figure 3:
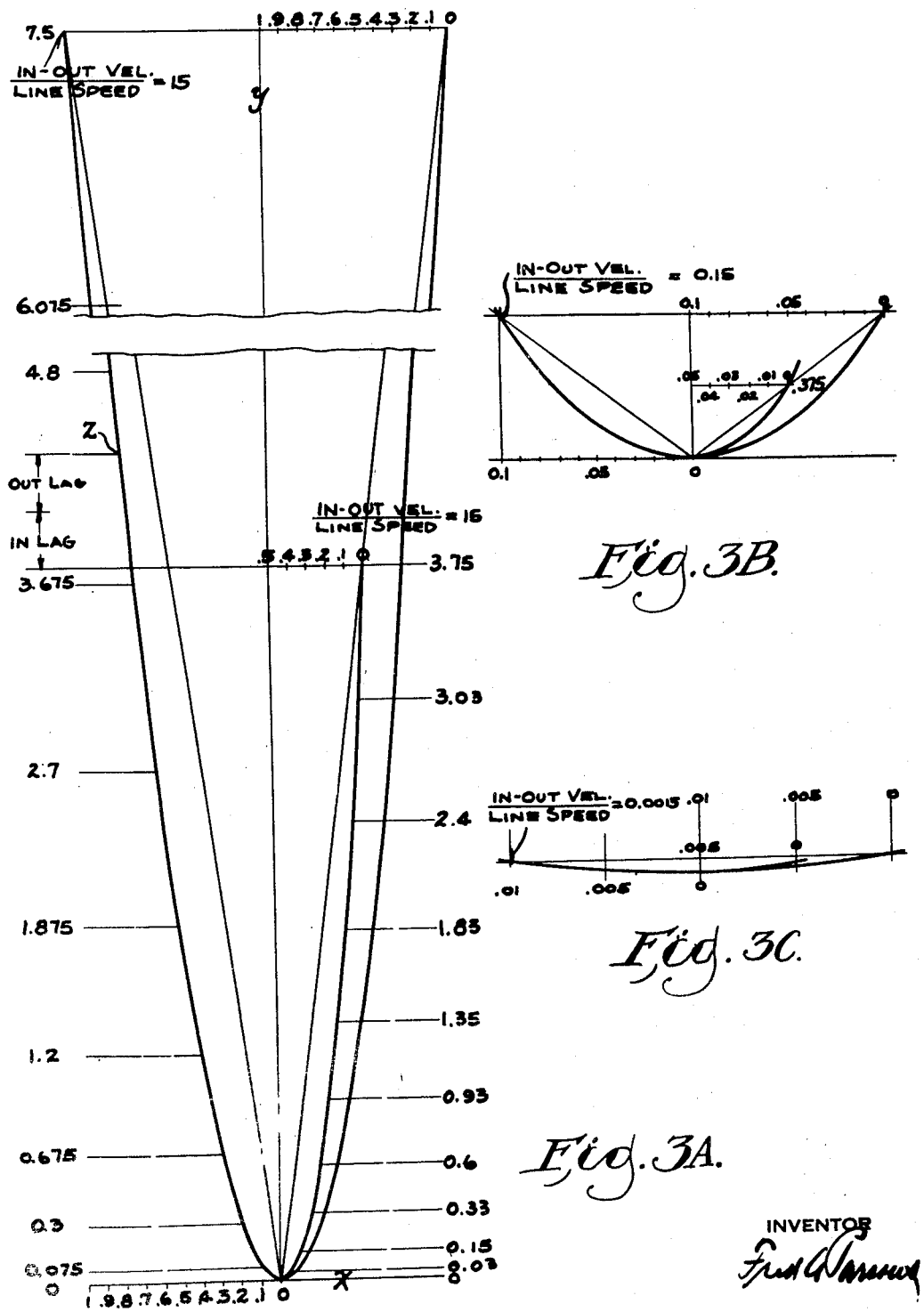
Figures 3A, 3B, 3C are diagrams showing a substantially parabolic cutter path which is characteristic of the operation of the primary control mechanism of the machine of Fig. 1, Figs. 3B, 3C being, in part, enlarged portions of Fig. 3A, respectively enlarged ten and 100 times.

Thus, in Fig. 3A the left portion of the outer curve shows the curved path where the in-out support 10 is uniformly accelerated from zero velocity to a velocity of 15 times the constant line speed in one unit of time. The right-hand portion of the outer curve shows the cutter path during uniform deceleration from the same velocity to zero velocity in the same time period.

Fig. 3B shows the lower portion of Fig. 3A enlarged about ten times to show the acceleration and deceleration paths where the same acceleration rate operates during only 0.1 of the same time unit, whereby the accelerated velocity is only 0.15 of the constant line speed.

Fig. 3C shows the lower portion of Fig. 3A still further enlarged, about one hundred times, to show the acceleration and deceleration paths where the same acceleration rate operates during only 0.01 of the same time unit, whereby the accelerated velocity is only 0.0015 of the constant line speed.

Each of Figs. 3A, 3B, 3C also shows (inner curve at right) the deceleration portion of the parabola where the uniform deceleration rate is twice that for the outer deceleration curves. For the inner curves the velocity at the start of deceleration is the same, but the zero velocity is effected in half the time required for the outer curve.

Figure 4:
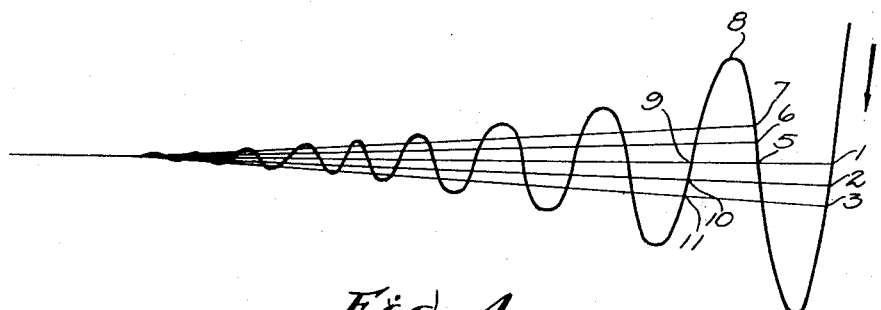
Figure 4 is a diagram showing the manner in which initial jiggles are stabilized in the machines of Figs. 1 and 2 when the tool direction changes abruptly from straight-in, or substantially straight-in, to the copying of a pattern surface which is parallel to the line direction of movement, that is to say to the copying of a pattern angle of 0°.

In the machine of Fig. 1 a change from in to straight-line movement, as may occur for example during the inward copying of the pattern surface 27a, starts with a series of in-out jiggles somewhat as shown at the right in Fig. 4, although Fig. 4 is not drawn to any particular scale. It will be understood that in the following description of the operation the lags mentioned refer to the travel of the machine during the time required for the control mechanism to respond to the pattern-controlled direction-correction impulses.

Referring to Fig. 4: At point 1 the stylus strikes the line surface of the pattern while the in movement is at a velocity determined by the preceding in angle. At point 2 the in tracer lag is completed whereby the out contact closes and the reverser valve 14 starts shifting from in to out adjustment. At point 3 the reverser lag is completed and the reversed force starts to decelerate the in movement. From points 3 to 4 the in velocity is decelerated to zero. At point 4 out acceleration begins. At point 5 the stylus starts to move clear of the pattern surface whereby the in contact closes. At point 6 the tracer out lag is completed and the reverser valve 14 starts shifting from out to in adjustment. At point 7 the reverser lag is completed and the reversed force starts to decelerate the out movement. From points 7 to 8 the out velocity is decelerated to zero. At point 8 the in acceleration starts. At point 9 the stylus again strikes the pattern, the same as at point 1, whereby to start a second similar cycle.

For the machine of Fig. 1, if the acceleration-deceleration forces controlled through the in-out reverser are such that acceleration from zero to any given velocity requires more time than deceleration from that velocity to zero, in other words where $t_a$ is greater than $t_d$, then in-out jiggles such as are shown at the right in Fig. 4 will progressively decrease in amplitude and in-out velocity. Each jiggle half-cycle is of less amplitude and velocity than the preceding half-cycle by an amount determined by the value of the ratio $t_a/t_d$.

Thus, for example, it may be assumed that the characteristics of the acceleration curve portions for the operation of Fig. 4 are the same as the acceleration curve shown at the left in Figs. 3A, 3B, 3C; and that the deceleration curve portions of Fig. 4 are the same as the inner deceleration curve at the right in Figs. 3A, 3B, 3C. In such case $t_a/t_d=2$, since the deceleration time is half the acceleration time.

Assuming further that the in velocity at point 1 of Fig. 4 is 15 times the constant line speed, then the deceleration, points 3 to 4, Fig. 4, will be represented by the inner deceleration curve at the right in Fig. 3A, and the acceleration, points 4 to 7, Fig. 4, will be represented by the acceleration curve at the left in Fig. 3A. Such acceleration will, however, proceed only to the point 7 of Fig. 4 which, after making proper allowance for the in lags, points 1 to 3, Fig. 4, and out lags, points 5 to 7, Fig. 4, is indicated at point Z of Fig. 3A. At such point Z (point 7, Fig. 4) the velocity is only about eight, instead of 15, times the line speed. Except for the lags the next succeeding deceleration would start (point 7, Fig. 4) with a velocity only half the velocity at point 1 when $t_a/t_d=2$. The successive jiggle half-cycles will operate similarly to reduce the in-out velocity, with corresponding reduction in jiggle amplitude.

If the in and out lag distances of Fig. 4 (such as occur at points 1 to 3, 5 to 7, 9 to 11, etc.) were of zero value then whenever $t_a$ is greater than $t_d$ the final effect of the progressive reduction of jiggle amplitude and velocity would be infinitely small values for both, whereby substantially straight line movement would result in the operation of Fig. 4.

The in and out lags cannot, however, be reduced to zero value. The lag distances (points 1 to 3, 5 to 7, etc.) diminish along with the in-out velocity somewhat as shown in Fig. 4, but nevertheless, as the amplitude of the jiggles becomes smaller a point is reached where the sum of the two lag-time intervals involved is sufficient for the velocity at the end of a jiggle half-cycle to be equal to the same half-cycle starting velocity and there will then be no further decrease in either amplitude or velocity, except as supplemental means are provided. The machine of Fig. 1 provides such supplemental means, as later described, whereby to reduce the jiggles for 0° angles to zero amplitude.

The construction of valve 14, Fig. 1, taken together with the one-way valve 13, operates as positive brake means to effect substantially instantaneous deceleration of the support 10 when the valve plunger is shifted from out to in position, or vice versa.

Thus, at the start of the movement of the valve plunger 14g in shifting, for example, from out to in position the pressure of the accumulator 18 is operating for acceleration in out direction. As the plunger moves from its left-hand position to its central position the tapered plunger throttle portions increasingly restrict both the valve port opening 14c through which fluid is flowing to the motor 15, and also the valve port opening 14d through which fluid is returning from the motor to the reservoir; until at the central position of the plunger both such ports are entirely closed whereby the closed return-port 14c would act as a positive brake, except that the central position of the valve is only instantaneous in the normal shifting of the plunger. As the plunger continues to move past the central position the valve ports start to open again and at completion of the shifting they are fully open.

The one-way valve 13 operates during deceleration caused by movement of valve 14 in either direction to prevent any reverse movement of fluid from the motor 15 through the port 14b which supplies pressure fluid to the valve, as would otherwise occur during deceleration after valve plunger 14g passes center whenever the momentum of the moving parts is sufficient to overcome the accumulator pressure. Valve 13 therefore continues the positive brake condition, first effected by the closing of the motor outlet port, until the in-out movement is decelerated to zero velocity, but the one-way valve offers substantially no resistance to the subsequent acceleration in the reverse direction when the tracer contact which caused the previous deceleration remains closed.

The acceleration-deceleration power required is materially reduced by semi-regenerative action of the described positive-brake means, in a manner somewhat similar to the operation of the positive-brake means described in said co-pending application Serial No. 462,714, now Patent No. 2,335,305, granted Nov. 30, 1943. Thus, during deceleration the energy of momentum of previously accelerated transmission parts operates in the closed passageway between the motor 15 and valve 14 or 13 to automatically effect the pressure necessary for the deceleration, the minimum limit of deceleration time being determined only by the strength of the walls which confine the liquid. The driving motor 11 therefor is required to furnish only the power for acceleration portions of the jiggle cycles, and during deceleration the pressure fluid from pump 12 is stored in the accumulator 18 to be used during the next acceleration portion of the cycles.

With the deceleration means described the initial jiggles of the operation of Fig. 4 are reduced to the minimum amplitude, determined by the lag characteristics of the machine, in a minimum of time, by reason of the relatively very large value of the ratio $t_a/t_d$ when the value of $t_d$ approaches zero. The point Z, for example, which in Fig. 3A indicates a reduction in in-out velocity of about one-half during each half-cycle of the jiggles of Fig. 4 where the acceleration time is twice the deceleration time, will be moved far downward on the acceleration curve where the described deceleration means are used, with the result that few jiggles are required to effect the stabilized result shown at the left in Fig. 4.

Moreover, the arrangement of Fig. 1 operates to completely eliminate the in-out jiggles of Fig. 4, in spite of the lags previously mentioned. Thus, when the jiggles have been reduced as described to the limit of minimum amplitude determined by the lags, the valve plunger 14g moves only slightly in either direction from center, and the action springs 14h, 14h, together with the spring detent 28 are then sufficient to bring the valve plunger to rest on its central position at a time when both the tracer contacts are open. For such result the in and out tracer contacts may be adjusted only sufficiently far apart to provide for a position of contact bar 25f in which neither contact is energized, whereby the straight-line surfaces of the pattern are copied with straight-path movement and with maximum accuracy of in-out positioning.

The progressive reduction of jiggle amplitude and in-out velocity for the operation of Fig. 4 when $t_a$ is greater than $t_d$, previously shown graphically, can readily be demonstrated mathematically. It can also be demonstrated mathematically, although difficult to show graphically, that, where $t_a$ is greater than $t_d$ there is a similar progressive reduction of the amplitude and velocity of any jiggles which occur during the copying of angles.

However, in order to copy an angular pattern surface the average velocity, in outward or inward direction as the case may be, must be equal to the product of the line speed multiplied by the tangent of the angle. It results that for any pattern angle greater than 0° the limit of jiggle stabilization is reached when the jiggle has zero velocity and zero amplitude in one direction (this would be in the in direction for out angles, and vice versa), and in the other direction an acceleration from zero velocity to a maximum velocity which will effect an average velocity of the value just stated, followed by deceleration to zero velocity. An angle-copying jiggle where the progressive reduction has proceeded to the limits just mentioned might be called an ideal stabilized jiggle.

Figs. 5A, 5B show the form of ideal stabilized jiggles, respectively for copying outward and inward angles of about 83°, such that the velocity is accelerated from zero to 15 times the constant line speed in one unit of time, and where the value of $t_a/t_d=2$. The acceleration curve portions (points T1 to T2) therefore are the same as the acceleration curve at the left in Fig. 3A and the deceleration curve portions (points T2 to T3) are the same as the inner deceleration curve at the right in Fig. 3A, although the scale of Figs. 5A, 5B is about one-half the scale of Fig. 3A.

Figure 6A:
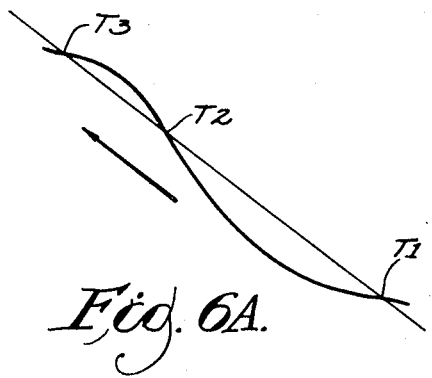
Figs. 6A, 6B are diagrams, respectively for outward and inward angles, which show the characteristic form of jiggles stabilized by the primary control mechanism of the machine of Fig. 1 during copying of angles of about 37°.
Figure 6B:
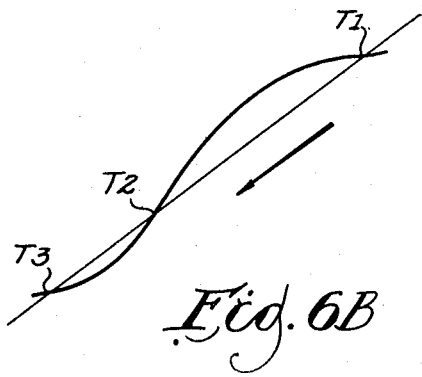

Similarly, Figs. 6A, 6B show the ideal stabilized jiggles respectively for outward and inward angles where the acceleration-deceleration constants are the same as before, but the angles are such (about 37½°) that the required maximum velocity is only 0.15 times the constant line speed, whereby the acceleration-deceleration curves are the same as shown in Figs. 3B.

Figure 7A:
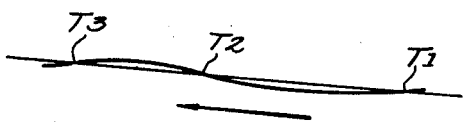
Figs. 7A, 7B are diagrams, respectively for outward and inward angles, which show the characteristic form of jiggles stabilized by the primary control mechanism of the machine of Fig. 1 during copying of angles of about 4°.
Figure 7B:
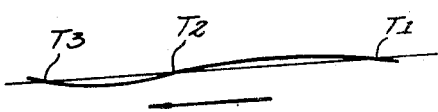

Also, Figs. 7A, 7B show the ideal stabilized jiggles respectively for outward and inward angles where the acceleration-deceleration constants are the same as before, but the angles are such (about 4°) that the required maximum velocity is only 0.0015 times the constant line speed, whereby the acceleration-deceleration curves are the same as shown in Fig. 3C.

It will be understood that the size of the jiggles shown in Figs. 4 to 7 is greatly exaggerated in the drawings. Where the line speed is not tracer controlled the relative size of the jiggles for different angles where $t_a/t_d=2$ will be approximately indicated by the relative size shown in Figs. 5, 6, 7, with due regard for the stated differences in the scale of the respective drawings. It is characteristic of the machine of Fig. 1, however, that, other things being the same, the jiggles become larger both in amplitude and length as the copied angles approach 90°, as is indicated in the diagrams. In general, the size of the jiggles for any angles larger than 0° may be reduced either by decreasing the constant line speed, or by increasing the acceleration-deceleration rate, or both. In the machine of Fig. 1 the deceleration rate cannot be materially increased, since deceleration is substantially instantaneous by reason of the described positive brake operation of the valves 14 and 13. The use of such deceleration means, however, permits of increase in acceleration rate to any practicable limit without serious detriment to the described jiggle-stabilizing result. The increase of acceleration rate for effecting smaller jiggle size is to be preferred to a reduction in line speed, at least for the machine of Fig. 1 where the line speed is assumed to be constant, since reducing the line speed correspondingly reduces the production of the machine.

The jiggles for all angles may, however, be further stabilized to effect substantially zero amplitude by the use of a secondary or straight-path control mechanism supplementing the previously described primary control means, as will now be described.

For effecting straight-path copying of outward angles there is provided a device, generally indicated by the numeral 35, Fig. 1, which operates to limit the deceleration of outward velocity somewhat after the manner of the straight-path control means of said co-pending applications, and a device 36 similarly effects the straight-path copying of inward angles by limiting the deceleration of in velocity. Supplemental other means are required for such results but since the construction and operation is similar for both the out and in angle control only the operation of device 35 and its supplemental controls need be explained in detail, as follows:

The device 35 includes a piston plunger 35a which is continuously urged by a spring 35b against the abutment screw 28, in which position the plunger 35a will permit the valve plunger 14g to move to the right sufficiently to fully open the port 14d of valve 14 which operates to urge in movement of motor 15. However, pressure liquid will be admitted to the right face of the piston of plunger 35a, whereby to force it to the left, whenever a valve plunger 35d is shifted to the left against the resistance of a spring 35c, the volumetric rate at which the liquid is admitted being determined in part by the adjustment of a needle valve 35f and in part by the pressure of the liquid supply source which, in this case, is established by the accumulator 18. Another needle valve 35g is adjusted to permit fluid to drain out of the cylinder of plunger 35a, at a volumetric rate determined in part by the adjustment of the needle valve and in part by the pressure of the spring 35c which urges the plunger to the right. The adjustment of needle valves 35f, 35g is such that when valve 35d is open the plunger 35a is shifted to the left, but when valve 35d is closed the spring 35b forces the plunger relatively slowly to the right.

For operation of the straight-path devices 35, 36 the following mechanism is provided:

The valves 35d, 36d of the different straight-path devices may respectively be opened by solenoids 35h, 36h which may respectively be energized from the secondary coils of transformers 38, 39. The respective transformer primary coils are, however, only energized when a switch 40 is in its out or in contact positions, and then only when the respective out or in tracer contacts are closed.

The switch 40 is controlled to be automatically shifted to out and in contact position during the copying of outward and inward angles respectively. Such control is effected in part by a solenoid operated device 41 and in part by a switch 42; the switch 42 being controlled by a direction responsive device 16 shown at the upper right of Fig. 1.

The direction responsive device 16 may be located in either of the channels between the motor 15 and reverser valve 14, and operates to shift switch 42 to out and in contact positions whenever support 10 is moving in out and in directions respectively. It includes a plunger piston 16a operating in a cylinder 16b, and one-way valves 16c, 16d, together with ports 16e, 16f suitably positioned relative to the plunger ends; the switch 42 having an arm 42a which engages a suitable slot in plunger 16a to shift the switch according to the direction of movement of the plunger. The construction is such that the motor 15 cannot move any material distance in either out or in direction without correspondingly closing the out or in contact of switch 42.

The closing of the out and in contacts of switch 42 respectively energizes different coils 41a, 41b of the device 41, whereby the corresponding coil cores 41aa or 41bb operate through a pivoted lever 41c against the resistance of a spring 41d to close the out or in contacts of switch 40, but only if the corresponding contact of switch 42 remains closed for an appreciable period; the coils 41a, 41b each having characteristics such that they operate as chokes to delay the shifting of switch 40, more particularly to prevent the closing of either contact of the switch when the plunger 16a of device 16 oscillates to alternately close the different contacts of switch 42 as may occur, for example, at the start of the straight-line copying, see Fig. 4. Other choke means may be provided as at 45 to delay the response of switch 40, or other suitable delay means may be used instead of chokes.

Some of the described straight-path supplemental controls may be eliminated where the deceleration is substantially instantaneous, as has been described. In such case the device 16 will directly operate the switch 40. Thus, for example, where $t_d$ approaches zero value the initial in-out jiggles of Fig. 4 are of very small amplitude and the contacts of the switch 40 or 42 controlled by the device 16 may be set very close together without energizing either of the switch contacts during the preliminary in-out jiggles of Fig. 4, particularly if the piston area of plunger 16a of the direction responsive device is not too small.

The operation of the several described devices for the straight-path control for angle copying is as follows: Assuming, for example, that one of the out angles of Figs. 5A, 6A, or 7A is being copied, whereby motor 15 is moving substantially continuously in out direction. In such case both the switches 42 and 40 will be in out contact position and the solenoid 35h which opens valve 35d will then receive at least two current impulses from the secondary of transformer 38 during each cycle of the out acceleration-deceleration shown in the drawings, the one impulse occuring when the tracer out contact is closed to effect acceleration (points 1T to 3T of Figs. 5A, etc.) and the other when the tracer out contact is opened preliminary to closing the in contact for deceleration (points 2T of Figs. 5A, etc.). With the needle valves 35f, 35g properly adjusted the result is that during each acceleration-deceleration cycle the plunger 35a receives two increments of movement to the left in Fig. 1 and the successive cycles will operate for progressively shifting the plunger 35a to the left, thereby progressively limiting the right-hand movement of the valve plunger 14g which operates to decelerate the out movement of the motor 15.

During such progressive limitation of the movement of the valve plunger 14g, up to the time when the plunger is prevented from moving past its central position, the jiggles are of the stabilized form shown in Figs. 5A, 6A, 7A, except with much reduced deceleration time due to the positive-brake action of valves 14 and 13 during deceleration as previously described. It is true that the plunger does not travel the normal distance to the right of its central position during the progressive limitation, but since the tracer in contact will remain closed until the out deceleration is completed (at points 3T, Figs. 5A, etc.), and the positive-braking force operates in all plunger positions after the plunger reaches its central position, the deceleration result is the same regardless of whether the plunger travels only to center or completes its right-hand movement.

But when the movement of valve plunger 14g is further limited, whereby it is prevented from moving to its central position, a different action begins. The valve ports and valve plunger of valve 14 now act as a throttle device which determines the out velocity when the plunger is in its right-hand limit of movement, but will not permit of the velocity being reduced to zero, because an out force is now operating in all positions which can be occupied by the plunger 14g. Since the out velocity cannot be reduced to zero, a different type of copying jiggle is initiated. In Fig. 5A, for example, if the out velocity cannot be reduced to zero then there cannot be any "reverse curve" portions such as shown at X and Z. Furthermore, the continued further limitation of the right-hand movement of valve plunger 14g operates to progressively increase the minimum out velocity, whereby the out acceleration starts (points T1 and T3, Fig. 5A) with a velocity progressively greater than zero. The acceleration force operating in the left-hand position of plunger 14g remains the same, however, whereby the cutter-path during acceleration follows the same deceleration curve path as before except that the start of the acceleration does not occur at zero speed, being progressively higher up on the acceleration curve shown at the left in Fig. 3A.

Thus, referring to the acceleration curve at the left in Fig. 3A, which is the same, except twice the scale, as the acceleration curve of Fig. 5A, (points T1 to T2) the instant out velocities in terms of the constant line speed are represented by twice the values of the distance travelled as listed in the vertical column at the left in Fig. 3A. Due to the progressive limitation of the right-hand movement of the valve plunger 14g the out acceleration will eventually start (at points T1, T3, etc.) at an out speed which will copy the instant angle without jiggles. If, for example, the line speed is assumed to be 1 ins. p. m. and the copied out angle, Fig. 5A is 83°, such out speed will occur when the out deceleration has been limited as described to effect an out velocity of 1 ins. times the tangent of 83° (equals 8.144 ins. p. m.), which occurs on the acceleration curve Fig. 3A at the point where the vertical distance scale has a value of $$\frac{8.144}{2} = 4.07$$

But assuming that the described limitation of the right-hand movement of plunger 14g has proceeded until the angle of the out movement at the start of the out acceleration (point T1 of Fig. 5A) corresponds to the angle of the pattern, as described, the slightest additional acceleration while the plunger is in left-hand position will operate to open the tracer out contact and close the in contact, which then remain closed, whereby the secondary of transformer 38 is no longer energized at intervals and the valve 35d remains closed. The progressive limitation of the right-hand movement of valve plunger 14g will then cease. With the tracer in contact closed as just described there will be nothing operating to close the out contact again until sufficient fluid has been released through the needle valve 35g to permit plunger 35a to move to the right, together with the valve plunger 14g, sufficiently to again decelerate the out movement. The needle valve 35g may be adjusted for the rate at which the valve plunger moves to the right under such circumstances to be relatively slow, whereby the period will be relatively long during which the tracer in contact remains closed, and during which the out movement is substantially in a straight-path corresponding to the copied angle.

It will now be apparent that the result of the described operation of the device 35 is to progressively reduce the amplitude of the stabilized jiggles for outward angles (Figs. 5A, 6A, 7A, etc.) until the tool is following substantially a straight-path corresponding to the angle being copied, and with the tracer in contact closed. When such condition is effected jiggles of very small amplitude at relatively infrequent intervals will be sufficient to maintain a substantially straight-path result until such time as the pattern angle changes.

The operation of the device 36 for straight-path copying of inward angles is the same as that described for the device 35 in effecting the straight-path out angle copying and therefore need not be described in detail. In both cases the start of the throttling action of the valve 14 which results in straight-path movement is delayed during such time as the control devices prevent the movement of valve plunger 14g past its central position. Such delay is small, but operates for the cooperating primary and straight-path control means to stabilize any initial jiggles when the pattern angle changes, particularly since stabilization is rapidly effected by reason of the described substantially instantaneous deceleration.

During the straight-path operation by the means of the mechanism described any power otherwise required for overcoming inertia during acceleration-deceleration operations is substantially entirely eliminated.

Where the described primary control means is supplemented by the described straight-path control means, it is not necessary to compensate for overrun. Thus the operation of the straight-path control eliminates such overrun, indicated in Figs. 5A, 5B, as occurs for outward or inward angles during a brief initial period after each change of pattern angle, and for very small angles and 0° angles the operation of the primary control means, of itself, effects a straight-path result, as explained for the operation of Fig. 4. There is, therefore, no necessity for the use of an oversize stylus in the manner explained in said co-pending applications, and the copying tool may be of any form, so far as concerns accurate copying, provided the stylus is of the same size and form and of the same in-out position, as indicated in Fig. 1.

If the straight-path control is not used, however, the overrun such as indicated in Figs. 5A, 5B will operate, unless prevented, to copy all opposite angles too far apart in the direction of the line movement. For profiling operations, where the line movement is alternately in opposite directions the overrun may be compensated, whereby to effect accurate copying without straight-path control, by use of a stylus and tool having a predetermined size and position relationship. For such purpose the tool should be of cylindrical form having a square end with sharp corners. The tracer stylus should be oversize in an amount corresponding to the cutter path curve during acceleration. Thus, the cutter may be of any suitable diameter and where the acceleration curve is as shown at the left in Fig. 3A the vertical center line of Fig. 3A will represent the outside of the cutter cylinder. The end of the stylus will be of the same diameter as the cutter and the same vertical center line of Fig. 3A will represent the outside of the stylus at its end, but the stylus diameter should increase upwardly in correspondence with the form of the acceleration curve at the left in Fig. 3A.

Figure 2:
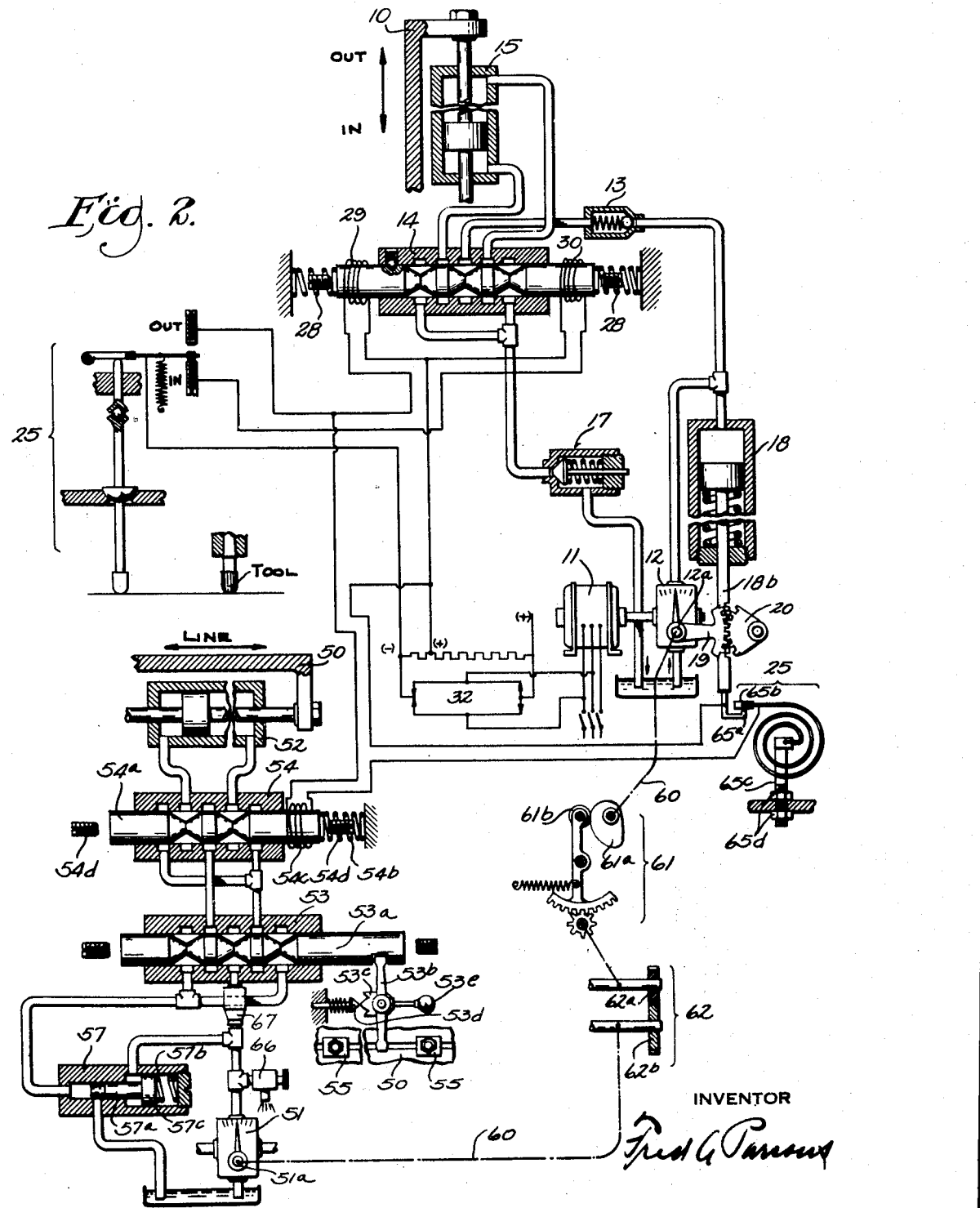
Figure 2 is a similar diagrammatic showing of the invention as applied to a machine where both the in-out and line paths of movement are pattern controlled.

In the machine of Fig. 2 the in-out transmission and control mechanism is the same as for the machine of Fig. 1, as is indicated by the use of the same reference characters for various of the parts, except that for simplicity the described straight-path control mechanism of Fig. 1 is not shown, although it obviously may be used, and is intended to be used, for the control of the reverser throttle valve 14 of Fig. 2 in the same manner and with the same result as for the control of the in-out movement in the machine of Fig. 1. Since the in-out transmission and control has already been fully described the description will not here be repeated, except as necessary for the understanding of the pattern control of the line transmission shown in Fig. 2.

Referring to Fig. 2 a line support 50 is provided with transmission and control mechanism including a variable volume rate change pump 51 having an adjustment shaft 51a. Pump 51 may be driven from the same motor 11 which drives pump 12, or by any suitable constant speed means. The pump drives a reversible hydraulic motor 52 through a primary reverser valve 53 and a supplemental reverser valve 54, the hydraulic motor being connected for movement of the support.

The supplemental reverser valve 54 includes a plunger 54a which is continuously urged by a spring 54b to a position to the left of the central position shown in Fig. 2, but may be shifted to the right of the central position by the means of a solenoid 54c, there being adjustable abutments 54d, 54d respectively determining the extent of the opposite movements.

The primary reverser valve 53 includes a valve plunger 53a which may be automatically shifted to reverse the direction of line movement by the means of dogs such as 55, 55 adjustably spaced apart on the support 50 and adapted to contact the one end of a pivoted lever 53b, the other end of the lever having a lost motion engagement with a suitable slot in the valve plunger 53a, there being detent means including a cam 53c fixed with the lever 53b and engaging a spring pressed detent plunger 53d.

Provided the supplemental reverser valve plunger 45b is in said spring-pressed position, which will be the case at any time when the support 50 is at the end of its line movement, the one or the other of the properly adjusted dogs 55 will contact the lever 55b at each end of the line movement, whereby to partially shift valve plunger 53a and shift the detent cam past its central position, whereupon the detent plunger operates to continue the movement of the valve plunger 53a into the reverse direction position whereby to reverse the direction of line movement. The valve plunger 53a may also be shifted by the means of a hand lever 53e.

The construction and arrangement of the supplemental valve 54 is such that the energizing of the solenoid 54c operates in the first instance to shift the valve plunger to decelerate the movement of the support 50 in either of the directions primarily established by the reverser 53, but if the valve plunger 54a is continued in its solenoid determined position the result is to reverse the direction of the support movement established by reverser 53. The solenoid is tracer controlled, as later described, but only energized at intermediate points of the line movement, whereby such control does not interfere with the described dog controlled operation of the primary reverser valve 53, which occurs only at the ends of the line movement.

In either direction of movement of the support 50 the outlet liquid from motor 52 is released through a back pressure valve 57, having a throttle plunger 57a continuously urged by a spring 57b in a direction to increase the motor back pressure, the spring pressure being opposed, however, by the instant forward pressure of the pump 51 operating on a piston 57c fixed with the plunger. The arrangement is such that the back pressure of motor 52 is reduced as the forward pressure of pump 51 is increased, and vice versa, but is sufficient at all times to eliminate slack and lost motion in the transmission of the line support 50.

The adjustment shafts 12a and 51a of the pumps of Fig. 2 are interconnected, by any suitable means diagrammatically indicated by the numeral 60, in such manner that the volumetric delivery of the one pump is decreased as the other is increased, and vice versa. The segments 19, 20, Fig. 2, operate to automatically adjust the pump 12 in accordance with the requirements of the instant pattern angle in the manner described for the machine of Fig. 1, and by reason of the interconnection 60 the pump 51 is simultaneously adjusted but in opposite direction. Since the interconnecting means operates as mentioned to automatically reduce the line speed when the in-out speed is large, and the required in-out speed for any angle is reduced as the line speed is reduced, it results that for large angles the stabilized copying jiggles effected by the control of reverser valve 14 in the machine of Fig. 2 require in-out speeds which are only a fraction of the in-out speeds required where the line speed is constant as in the machine of Fig. 1.

A preferred arrangement for the interconnection of the pumps 12 and 51 of Fig. 2 is such that the sum of the volumetric delivery of the pumps 12 and 51 is constant, or approximately so. Depending upon the characteristics of the pumps used in the machine such result may be obtained by direct interconnection of the control shafts or may require coordinating means included in the interconnection 60, such for example as a cam means generally denoted by the numeral 61, in which the cam 61a may be of any suitable form to suit the pump characteristics; and the rate change means generally denoted by the numeral 62 in which the gear pair 62a, 62b is reversible and interchangeably replaceable by other similar pairs of different ratio whereby to provide various relative rates of pump adjustment.

It will be seen that the described interconnection of the pumps 12 and 51 operates to control the line movement from the tracer 25 in accordance with the configurations of the pattern, since it is the tracer control which determines the volumetric requirements and adjustment position of pump 12, as described for Fig. 1. Such tracer control of pump 51 is somewhat indirect, however, and not entirely satisfactory for large pattern angles. To improve the copying result for a series of large angles, up to 90°, and also to enable the copying of angles larger than 90° the supplemental reverser valve 54 is controlled directly from tracer 25, but only for the large angles.

For such result a switch 65 is arranged for the contacts 65a, 65b thereof to be opened or closed in accordance with the position of the piston rod 18b of accumulator 18. The piston rod moves upwardly, Fig. 2, as the copied angle increases, as has been stated in describing the operation of the accumulator for the machine of Fig. 1. The position of the contact 65b is adjustable by the means of a threaded stem 65c and nuts such as 65d, and the adjustment may be such as to close the switch contacts at any desired point as the copied angle increases, following which the contacts will remain closed for all larger angles. When the contacts of switch 65 are closed the solenoid 54c will be energized whenever the out contact of tracer 25 is closed, whereby the valve plunger 54a is shifted to decelerate or reverse the line movement, as has been described, until the out contact opens again. The deceleration or reversal may operate to increase the pressure of the line liquid supplied by pump 51, and to relieve excess pressure there is provided an adjustable safety relief valve 66 which may be of any well-known type. To assist in rapid line deceleration there is provided a one-way valve 67 in the supply channel leading from the pump 51 to the reverser valve 53. The one-way valve 67 is of the same construction as the valve 13 in the in-out transmission, and operates similarly to the described operation of valve 13 of Fig. 1 to effect substantially instantaneous braking during any deceleration of the line movement from either of the reverser valves 53 or 54 during the shifting of the valve plungers in either direction through central position.

By reason of the construction shown for the valve 54, and the cooperating action of one-way valve 57, the described tracer control of the supplemental valve 54 operates for large angles, in either direction of line movement as primarily established by the reverser valve 53, to effect a substantially similar stabilized jiggle control for the line movement to that which has been described for the in-out movement in the machine of Fig. 1. Such stabilized jiggle control of the line movement, supplemented by the stabilized jiggle control of the in-out movement in the machine of Fig. 2 operates for accurate copying of large angles up to 90° and, in the case of outward angles at least, the tracer control also operates to reverse the line movement whereby to effect copying of angles larger than 90°.

It will be understood that the straight-path control devices 35, 36, Fig. 1, together with the described supplemental controls therefor are intended to be used for control of the reverser throttle valve 14 of the machine of Fig. 2 in the same manner as described for the machine of Fig. 1, although not shown in Fig. 2 in order to simplify the drawings. Either machine will obviously be effective for copying where only the primary tracer control is used for reverser throttle valve, but in certain respects the straight-path control is more useful in the machine of Fig. 2 than for the machine of Fig. 1. However, since the straight-path is primarily effected by a correction of relative rates, the adjustment of pump 51 also operates for a straight-path result and in many cases will be sufficient for such purposes.

Thus, in the machine of Fig. 1, the lags may be compensated, as has been described, to effect inherently accurate copying where the straight-path control is not used, because the constant line rate which is characteristic of that machine operates for the acceleration-deceleration tool path curves to be the same for all angles. In the machine of Fig. 2, however, the line rate changes automatically with changes of pattern angle, whereby the cutter path curve changes correspondingly unless means, not shown, is provided to maintain the curve constant for the different angles. It therefore would be more difficult to fully compensate for the lags in the machine of Fig. 2, but where the straight path control is used in combination with the primary control such lag compensation is not necessary, as has been pointed out.

In both the machines, but particularly in the machine of Fig. 2, it is to be understood that the described automatic adjustment of the pumps 12 and 51 is not expected to follow each increment of change of volume of fluid delivered to the in-out motor. Thus any resiliency or yielding of the pump adjusting connections, or of the liquid which is under pressure from the accumulator 18, as well as any lost motion in the connections, will operate to prevent the pump adjustment from instant response to volumetric variations such, for example, as occur during acceleration-deceleration jiggles, particularly since such changes are necessarily very small, and where any such resiliency, yielding or lost motion exists the pump adjustment will follow only the average volume requirement of a series of such jiggles.

For simplicity, the pumps are shown connected to be adjusted by power supplied directly from the piston rod of the accumulator. However, various well-known forms of power relay devices, not shown, might be used instead, and such use is contemplated. Where such relay devices are used the lag or delay in the operation of the relay, which is inherent in the operation of all relay devices, will also operate to prevent the instant response of the pump adjustment to small variations in the volumetric requirements of the in-out motors.

It will be noted that for the machines of Figs. 1, 2 the pump 12 of Fig. 1 and both the pumps 12 and 51 of Fig. 2 operate as rate change means adjustable in accordance with the relative rates of in or out and line movement, while the tracer and its associated controls operates for automatically determining such relative rate in accordance with the instant pattern requirements, the arrangement operating to avoid various power losses particularly where the secondary straight-path control is used, which would be unavoidable in the absence of tracer control of the rate changer adjustment.

What is claimed is:

1. In a pattern controlled machine tool the combination of an in-out support movable for relative movement of a tracer and pattern toward or from one another in an in-out path, said tracer and pattern being relatively movable in another path transverse to said in-out path, power operable transmission mechanism for said in-out support movement including a pump adjustable for variable volume delivery of liquid, reverser valve means alternatively adjustable to different support direction positions and a reversible hydraulic motor, control means operable under the control of said tracer and pattern during their relative movement in said other path to effect successive adjustments of said reverser valve means determinative of the volume of liquid delivered to said motor from said pump, and an accumulator connected at a point between said pump and reverser valve means to receive liquid from said pump when the pump adjustment is such that the pumped volume is in excess of the instant motor requirements as determined by said control means, and to deliver liquid to said motor when the pump adjustment is such that the pumped volume is insufficient, a control member movable in different directions respectively when said accumulator is receiving and delivering liquid, and means operable in accordance with the direction of movement of said member for the volumetric adjustment of said pump.

2. In a pattern controlled machine tool the combination of a support movable for relative movement of a tracer device and pattern toward or from one another in an in-out path, said tracer and pattern being relatively movable in another path transverse to said in-out path, power operable transmission mechanism for said in-out support movement including reverser means alternatively adjustable to different support direction positions, a power source for actuating said transmission mechanism, control means operable under the control of said tracer and pattern during their relative movement in said other path to effect successive adjustments of said reverser means for alternative acceleration and deceleration periods of movement in said in-out path determinative of an average rate of in-out movement for said tracer to follow a pattern configuration at an angle to both said paths, and a power accumulator device associated with said power source and transmission mechanism in a manner effecting storage of power derived from said source during the adjustment periods of said reverser means which result in said deceleration of support movement and effecting delivery of stored power to said transmission mechanism during the adjustment periods of such reverser means which result in said acceleration of support movement.

3. In a pattern controlled machine tool the combination of a support movable for relative movement of a tracer device and pattern toward or from one another in an in-out path, said tracer and pattern being relatively movable in another path transverse to said in-out path, power operable transmission mechanism for said in-out support movement including adjustable rate change means and reverser means alternatively adjustable to different support direction positions, a power source for actuating said transmission mechanism, control means operable under the control of said tracer and pattern during their relative movement in said other path to effect successive adjustments of said reverser means for alternative acceleration and deceleration periods of movement in said in-out path determinative of an average rate of in-out movement for said tracer to follow a pattern configuration at an angle to both said paths, a power accumulator device associated with said power source and transmission mechanism in a manner effecting storage of power derived from said source during the adjustment periods of said reverser means which result in said deceleration of support movement and delivery of stored power to said transmission mechanism during the adjustment periods which result in said acceleration of support movement, control means associated with said accumulator and providing different control results respectively when said average rate is such that the accumulator is storing power and when said average rate is such that the accumulator is delivering power, and power operable means for the adjustment of said adjustable rate change means in one direction or the other in accordance with the different control results of the last mentioned control means.

4. In a pattern controlled machine tool including a tracer and a pattern, the combination of an in-out support movable for relative movement of said tracer and pattern toward or from one another in an in-out path, said tracer and pattern being relatively movable in another path transverse to the in-out path, mechanism for said movement including a power source adjustable for different rates of delivery of energy, an energy accumulator device and means for alternative acceleration or deceleration of the rate of said support movement, control means for said mechanism operable under the control of said tracer and pattern during movement in said other path to effect cyclic alternate phases of said acceleration and deceleration for a tool to follow a work piece in substantial conformity with the configuration of said pattern, means operatively connecting said accumulator to receive and store some of the energy of said power source during the deceleration phases of said cycles and to deliver stored energy during acceleration phases to assist in the acceleration result, control means associated with said accumulator device and oppositely responsive when the accumulator receives more or less energy than it delivers, means connecting the last mentioned control means for the adjustment of said power source in accordance with the response direction of the control means.

5. In a pattern controlled machine tool including a tracer and a pattern, the combination of an in-out support and a line support respectively movable for relative movement of said tracer and pattern in in-out and line paths, power operable transmission mechanism including means for alternative acceleration or deceleration of support movement in said in-out path and adjustable line reverser means normally urged for an adjustment position effecting forward direction of said line movement, control means for said in-out acceleration-deceleration means operable under the control of said pattern and tracer during relative movement in said line path to effect successive cyclic alternate acceleration and deceleration for a tool to follow a work piece in substantial conformity with the configuration of the pattern, control means for said line reverser means operative under the control of said tracer to urge the reverser means toward reverse direction adjustment thereof during tracer determined intervals of said successive cycles, and other control means for said reverser means operable to shift the reverser means to effect reverse direction line movement after predetermined forward direction of line movement in either direction of said line path.

6. In a pattern controlled machine tool including a tracer and a pattern, the combination of an in-out support and a line support respectively movable for relative movement of said tracer and pattern in in-out and line paths, power operable transmission mechanism including reverser means adjustable for alternative positions respectively for out or in direction of movement in said in-out path and a plurality of reverser devices independently adjustable for directional control of support movement in said line path, control means for said in-out reverser means operable under the control of said tracer and pattern during relative movement in said line path for a tool to follow a work piece in substantial conformity with the configuration of the pattern, control means for one of said line reverser devices including spaced trip devices respectively operative to establish opposite directions of forward movement in the line path, and control means for the other line reverser device operable under the control of said tracer and pattern in either direction of said forward movement to shift the reverser device to an adjustment urging the opposite direction of line movement at intervals determined by the tracer.

7. In a pattern controlled machine tool including a tracer and a pattern, the combination of an in-out support and a line support respectively moveable for relative movement of said tracer and pattern in in-out and line paths, power operable transmission mechanism including reverser means adjustable for alternative positions respectively for out or in direction of movement in said in-out path and a plurality of reverser devices independently adjustable for directional control of support movement in said line path, control means for said in-out reverser means operable under the control of said tracer and pattern during relative movement in said line path for a tool to follow a work piece in substantial conformity with the configuration of the pattern, control means for one of said reverser devices including spaced trip devices respectively operative to establish opposite directions of forward movement in the line path, control means for the other reverser device operable under the control of said tracer and pattern in either direction of said forward movement to shift the reverser device to an adjustment urging the opposite direction of line movement at intervals determined by the tracer, and means limiting the last mentioned control means to be operative only during out direction movement in said in-out path.

8. In a pattern controlled machine tool including a tracer and a pattern, the combination of an in-out support and a line support respectively movable for relative movement of said tracer and pattern in in-out and line paths, power operable transmission mechanism including reverser means adjustable for alternative positions respectively for out or in direction of movement in said in-out path and a plurality of reverser devices independently adjustable for directional control of support movement in said line path, control means for said in-out reverser means operable under the control of said tracer and pattern during relative movement in said line path for a tool to follow a work piece in substantial conformity with the configuration of the pattern, control means for one of said reverser devices including spaced trip devices respectively operable to establish opposite directions of forward movement in the line path, control means for the other reverser device operable under the control of said tracer and pattern in either direction of said forward movement to shift the reverser device to an adjustment urging the opposite direction of line movement at intervals determined by the tracer, and means limiting the last mentioned control means to operate only during the copying of relatively large outwardly directed pattern angles.

9. In a pattern controlled machine tool including a tracer and a pattern the combination of an in-out support movable to effect relative movement of said tracer and pattern toward or from one another in an in-out path, said tracer and pattern being relatively movable in another path transverse to the in-out path, power operable transmission mechanism for said movements, control means associated with said transmission mechanism including means continuously urging acceleration of said in-out support movement and means operable for effecting deceleration thereof, said deceleration means being operable under the control of said tracer and pattern during the relative movement in said other path to provide successive cyclic alternate phases of said acceleration and deceleration effecting various rates of in-out movement for a tool to follow a work piece in substantial conformity with the configuration of the pattern, and a supplemental straight-path control mechanism including acceleration limiting means operable under the control of said tracer during said repeated cycles of said acceleration and deceleration to effect progressively increasing resistance opposing said means urging in-out acceleration.

10. In a tracer controlled machine tool, a support arranged to be actuated under tracer control, a hydraulic motor operatively connected to actuate said support, a hydraulic control circuit operatively connected to said hydraulic motor, said circuit including a reversing valve and a source of hydraulic pressure controlled by said valve, a guiding tracer operatively connected to actuate said reversing valve in manner to effect movement of said support in the one or the other direction selectively, movable stop members disposed to limit the extent of movement of said reversing valve from its neutral position, and a control system responsive to movement of said support and operative to move said stops in manner to reduce the extent of movement of said reversing valve from neutral position in proportion to the time during which said support continues to move in the same direction.

11. In a tracer controlled machine tool, a support arranged for in-out movement under tracer control, a cooperating support arranged for line movement, a source of hydraulic pressure, hydraulic motors connected to actuate said supports respectively, a hydraulic control system operatively connecting said source of pressure to said motors, a guiding tracer mechanism operative upon said control system to control said in-out movement, a reversing valve in said control system operative to effect reversal of said line movement at predetermined terminal positions, and a second reversing valve connected in said system and operative to control said line movement in response to said tracer mechanism in manner to reduce the rate of line movement in accordance with increase in the rate of in-out movement.

12. In a tracer controlled machine tool, a cutter and tracer support mounted for in-out movement in response to tracer control while traversing a pattern, a hydraulic motor operatively connected to effect said in-out movement, a source of hydraulic pressure for operating said motor, a control circuit including a reversing valve having a movable reversing and throttling plunger arranged to connect said source of pressure to said motor to operate it in either in or out direction selectively, tracer mechanism operatively connected to actuate said reversing valve plunger in accordance with the requirements of the pattern being followed, movable stop members selectively positionable to limit the extent of movement of said reversing valve plunger, a control system rendered operative in response to continuous movement of said support in one direction and connected when operative to receive impulses from said tracer mechanism resulting from its operation in controlling said support movement, and apparatus responsive to said control system and operative to move one of said movable stop members in direction to progressively limit the extent of movement of said reversing valve plunger in response to impulses from said tracer mechanism for stabilizing movement of said support in said direction.

13. In a tracer controlled machine tool, a supporting structure arranged for in-out movement, a hydraulic motor operatively connected to effect in-out movement of said supporting structure, a variable capacity pump for supplying hydraulic fluid under pressure to actuate said motor, tracer control apparatus operative to admit hydraulic pressure from said pump to said motor in varying amounts in accordance with the requirements of a pattern being traced, an accumulator connected to said pump in manner to accumulate pressure fluid when the amount required by said motor is small and to supply pressure fluid when the amount required by said motor is large, and control apparatus responsive to the amount of pressure fluid in said accumulator and operating on said variable capacity pump in manner to increase or decrease its capacity as required to maintain the amount of fluid in said accumulator substantially constant.

14. In a tracer controlled machine tool, a support arranged to be actuated under tracer control, a hydraulic motor operatively connected to actuate said support, a hydraulic control circuit operatively connected to said hydraulic motor, said circuit including a reversing valve and a source of hydraulic pressure controlled by said valve, a guiding tracer operatively connected to actuate said reversing valve in manner to effect movement of said support in the one or the other direction selectively, movable stop members disposed to limit the extent of movement of said reversing valve from its neutral position, and a control system responsive to continued movement of said support in one direction and to said guiding tracer and operative to move one of said stop members in manner to reduce the extent of movement of said reversing valve from neutral position in proportion to the time during which said support continues to move in the same direction.

15. In a tracer controlled machine tool, a support arranged for in-out movement under tracer control, a cooperating support arranged for transverse line movement, a source of hydraulic pressure, hydraulic motors connected to actuate said supports respectively, a hydraulic transmission system operatively connecting said source of pressure to said motors, a guiding tracer mechanism operative upon said transmission system to control said in-out movement in accordance with a pattern being traced, a reversing valve in said transmission system operative to effect reversal of said line movement at predetermined terminal positions, a second reversing valve connected in said transmission system and operative to control said line movement, and control means responsive to said tracer mechanism and operative upon said second reversing valve in manner to reduce the rate of line movement in accordance with increase in the rate of in-out movement thereby correlating said movements.

16. In a pattern controlled machine tool, a carriage arranged for in and out movement under pattern control, a hydraulic system operatively connected to actuate said carriage, a throttling reverser valve in said hydraulic system and operative to control the rate and direction of movement of said carriage, movable stop means operative to limit movement of said throttling reverser valve in manner to limit the rate of movement of said carriage, a control device responsive to continued movement of said carriage in one direction, and stop moving means responsive to said control device upon continued movement of said carriage in one direction under pattern control and operative to advance said movable stop means in rate limiting directions to reduce and limit the rate of movement of said carriage.

17. In a tracer controlled machine tool, a carriage arranged for in-out movement under tracer control, a carriage arranged for line movement in cooperative relationship with said in-out carriage, power operated transmission mechanism connected to effect coordinated movements of said carriages, a reverser mechanism in said transmission mechanism responsive to movement of said line carriage and operative to effect reversal in the direction of movement thereof at predetermined terminal positions, a tracer mechanism operatively connected to control movement of said in-out carriage in accordance with a pattern being traced, a second reverser mechanism in said line carriage driving transmission mechanism, and control mechanism responsive to said tracer mechanism and operative upon said second reverser mechanism in manner to coordinate movement of said line carriage with movement of said in-out carriage.

18. In a tracer controlled machine tool, a support arranged for in-out movement, a source of power for moving said support, a tracer mechanism operative to apply power from said source to move said support in the one or the other direction in accordance with a pattern being followed, control mechanism rendered operative in response to continued movement of said support in one direction, and power controlling means operating in response to functioning of said control mechanism and said tracer mechanism to limit the amount of power applied by said tracer mechanism to move said support, the arrangement being such that movement of said support in said one direction is stabilized.

19. In a tracer controlled machine tool, a cutter and tracer support mounted for in-out movement in response to tracer control while traversing a pattern, a hydraulic motor operatively connected to effect said in-out movement, a source of hydraulic pressure for operating said motor, a control circuit including a reversing valve having a movable reversing and throttling plunger arranged to connect said source of pressure to said motor to operate it in either in or out direction selectively, tracer mechanism operatively connected to actuate said valve plunger in accordance with the requirements of the pattern being traversed, movable stop members selectively positionable to limit the extent of movement of said valve plunger for throttling said motor, a control system rendered operative in response to continuous movement of said support in one direction and connected to receive impulses from said tracer mechanism resulting from its operation in effecting decelerating movement of said support, and apparatus responsive to said impulses from said tracer mechanism impressed upon said control system and operative thereby to move one or the other of said movable stop members in direction to progressively limit the extent of movement of said valve plunger in response to accelerating actions of said tracer mechanism to throttle said motor for stabilizing said continuous movement of said support in said direction.

FRED A. PARSONS.

REFERENCES CITED

The following references are of record in the file of this patent:

UNITED STATES PATENTS

| Number | Name | Date |
|---|---|---|
| 1,905,133 | Bishop | Apr. 25, 1933 |
| 1,952,231 | Anderson | Mar. 27, 1934 |
| 2,025,748 | Howe | Dec. 31, 1935 |
| 2,068,890 | Sassen | Jan. 26, 1937 |
| 2,108,025 | Shaw | Feb. 8, 1938 |
| 2,226,677 | Vikhman | Dec. 31, 1940 |
| 2,228,902 | Allen | Jan. 14, 1941 |
| 2,250,241 | Thalmann | July 22, 1941 |
| 2,254,229 | Lochman | Sept. 2, 1941 |
| 2,283,516 | Tyler | May 19, 1942 |
| 2,307,503 | Gulliksen | Jan. 5, 1943 |
| 2,307,544 | Robinson | Jan. 5, 1943 |
| 2,335,305 | Parsons | Nov. 30, 1943 |

FOREIGN PATENTS

| Number | Country | Date |
|---|---|---|
| 378,899 | Great Britain | Aug. 15, 1932 |